US010011324B2

(12) United States Patent
Inoue

(10) Patent No.: US 10,011,324 B2
(45) Date of Patent: Jul. 3, 2018

(54) ELECTRIC VEHICLE

(71) Applicant: KAWASAKI JUKOGYO KABUSHIKI KAISHA, Kobe-shi, Hyogo (JP)

(72) Inventor: Masafumi Inoue, Miki (JP)

(73) Assignee: KAWASAKI JUKOGYO KABUSHIKI KAISHA, Kobe-shi, Hyogo (JP)

(*) Notice: Subject to any disclaimer, the term of this patent is extended or adjusted under 35 U.S.C. 154(b) by 253 days.

(21) Appl. No.: 14/654,898

(22) PCT Filed: Dec. 25, 2012

(86) PCT No.: PCT/JP2012/008252
§ 371 (c)(1),
(2) Date: Jun. 23, 2015

(87) PCT Pub. No.: WO2014/102854
PCT Pub. Date: Jul. 3, 2014

(65) Prior Publication Data
US 2015/0329175 A1 Nov. 19, 2015

(51) Int. Cl.
B60L 11/18 (2006.01)
B62M 7/04 (2006.01)
(Continued)

(52) U.S. Cl.
CPC ............... B62M 7/04 (2013.01); B60K 1/00 (2013.01); B60K 1/04 (2013.01); B60L 11/1803 (2013.01);
(Continued)

(58) Field of Classification Search
USPC ...................................................... 307/10.1
See application file for complete search history.

(56) References Cited

U.S. PATENT DOCUMENTS 8,556,018 B2 * 10/2013 Fujihara .............. B60L 11/1877
180/220
9,010,476 B2 * 4/2015 Matsuda ................ B62K 11/04
180/220
(Continued)

FOREIGN PATENT DOCUMENTS

JP 2002264664 A 9/2002
JP 2012096594 A 5/2012
(Continued)

OTHER PUBLICATIONS

ISA Japanese Patent Office, International Search Report Issued in Application No. PCT/JP2012/008252, dated Apr. 2, 2013, WIPO, 2 pages.

Primary Examiner — An Luu
(74) Attorney, Agent, or Firm — Alleman Hall Creasman & Tuttle LLP

(57) ABSTRACT

An electric vehicle includes an electric motor which generates a driving power for driving a wheel, a battery storing DC power to be supplied to the electric motor, a battery case accommodating the battery in a battery space in an interior of the battery case, an inverter which converts the DC power supplied from the battery and supplies electric power to the electric motor, and an electric wire connecting the inverter to the electric motor. The electric wire runs through an internal space of the battery case, and may penetrate an upper surface of the battery case, protrude upward, and connect to an inverter placed on an upper portion of the battery case. The electric wire may run through a cooling passage in the internal space. The electric wire may be interposed between the electric motor and the inverter. The electric wire may run vertically through the internal space.

17 Claims, 10 Drawing Sheets

(51) Int. Cl.
*B60K 1/04* (2006.01)
*B60K 1/00* (2006.01)
*B62K 11/04* (2006.01)
*B62K 19/40* (2006.01)

(52) U.S. Cl.
CPC ............ *B62K 11/04* (2013.01); *B62K 19/40* (2013.01); *B60Y 2200/12* (2013.01); *B62K 2204/00* (2013.01); *B62K 2208/00* (2013.01)

(56) References Cited

U.S. PATENT DOCUMENTS 9,160,214 B2 *  10/2015  Matsuda ................. B60K 1/00
9,463,695 B2 *  10/2016  Matsuda ................. B62K 11/04

FOREIGN PATENT DOCUMENTS

| WO | 2012043562 A1 | 4/2012 |
| WO | 2012090246 A1 | 7/2012 |
| WO | 2012132582 A1 | 10/2012 |

* cited by examiner

ELECTRIC VEHICLE

TECHNICAL FIELD

The present invention relates to an electric vehicle which drives a wheel with driving power generated in an electric motor.

BACKGROUND ART

In recent years, an electric vehicle which drives a wheel with driving power generated in an electric motor using electric power supplied from batteries has been developed. The electric vehicle includes an inverter (motor driving device) which drives the electric motor using the electric power supplied from the batteries, an electric wire (power line) connecting the batteries to the inverter, and an electric wire connecting the inverter to the electric motor (e.g., see Patent Literature 1). In an electric motorcycle disclosed in Patent Literature 1, the wire connecting the motor driving device to the motor extends in a forward and rearward direction along a swing arm.

CITATION LIST

Patent Literature

Patent Literature 1: Japanese Laid-Open Patent Application Publication No. 2002-264664

SUMMARY OF INVENTION

Technical Problem

A current with a large magnitude flows among the batteries, the inverter, and the motor. In light of this, the electric wire is preferably placed in such a way that the electric wire is protected from an outside world and a driver of the electric vehicle is protected from the electric wire. If a protecting structure is provided additionally, the space efficiency of the electric vehicle may be reduced, or the external appearance of the electric vehicle may be degraded.

Accordingly, an object of the present invention is to increase the space efficiency of an electric vehicle by laying out an electric wire connecting an inverter to an electric motor in a compact manner, while protecting the electric wire more effectively.

Solution to Problem

The present invention provides an electric vehicle comprising: an electric motor which generates driving power for driving a wheel; a battery case accommodating a battery storing DC power to be supplied to the electric motor, in a battery space in an interior of the battery case; an inverter which converts the DC power supplied from the battery into AC power and supplies the AC power to the electric motor; and an electric wire connecting the inverter to the electric motor, wherein the electric wire runs through an internal space of the battery case.

In accordance with this configuration, since the electric wire (power line) connecting the inverter to the electric motor runs through the internal space of the battery case, this electric wire can be easily protected from outside and the space efficiency can be increased. In addition, since the electric wire can be covered by the battery case, the external appearance of the electric vehicle can be improved.

The battery case may be placed between the electric motor and the inverter.

In accordance with this configuration, a distance from the battery to the inverter and a distance from the battery to the electric motor can be reduced, and the electric wire connecting the inverter to the electric motor is allowed to run through the interior of the battery case, which can reduce the length of the electric wire.

The electric vehicle may further comprise: a motor case accommodating the electric motor, wherein the inverter may be placed above the battery case, and the electric motor may be placed below the battery case, wherein the electric wire may include a running portion vertically running through the internal space of the battery case, and wherein an electric cable may be provided between a lower portion of the battery case and the motor case to couple the lower portion of the battery case to the motor case, the electric cable electrically connecting the running portion to the electric motor and having a higher flexibility than the running portion.

In accordance with this configuration, even when the inverter and the electric motor are placed to be vertically spaced apart from each other with the battery case interposed between the inverter and the electric motor, the electric cable can be reduced in length and a wiring operation can be easily performed, as compared to a case where the electric wire runs through a region outside of the battery case.

The electric wire may include three bus bars for three-phase AC current which vertically runs through the internal space of the battery case, and surfaces of the three bus bars may be joined to each other via an insulating material to form a bus bar module.

In accordance with this configuration, the electric wire for a three-phase AC current can be accommodated in a compact manner in a limited space in the interior of the battery case, and can be handled more easily during assembly. In addition, since the elements of the electric wire are joined to each other via the insulating material, generation of noise in these elements of the electric wire can be suppressed.

The electric wire may include a portion which runs through the interior of the battery case, penetrates an upper surface of the battery case, and protrudes upward, and the portion may be connected to the inverter placed on an upper portion of the battery case.

In accordance with this configuration, since the electric wire running through the internal space of the battery case protrudes upward from the battery case, the inverter can be easily mounted later to the upper portion of the battery case which is closed.

The battery may be one of a plurality of batteries, and in the internal space of the battery case, a cooling passage may be constituted by a space formed between the plurality of batteries or between the batteries and the battery case, and the electric wire may run through the cooling passage in the internal space of the battery case.

In accordance with this configuration, since the space reserved to cool the battery is used as the space reserved to allow the electric wires to run therethrough, the size of the battery case is not increased.

Advantageous Effects of Invention

As should be appreciated from the above, in accordance with the present invention, the space efficiency of an electric vehicle can be increased and the external appearance thereof can be improved by laying out an electric wire connecting an inverter to an electric motor in a compact manner while protecting the electric wire more effectively.

DESCRIPTION OF EMBODIMENTS

Hereinafter, the embodiment will be described with reference to the drawings.

Figure 1:
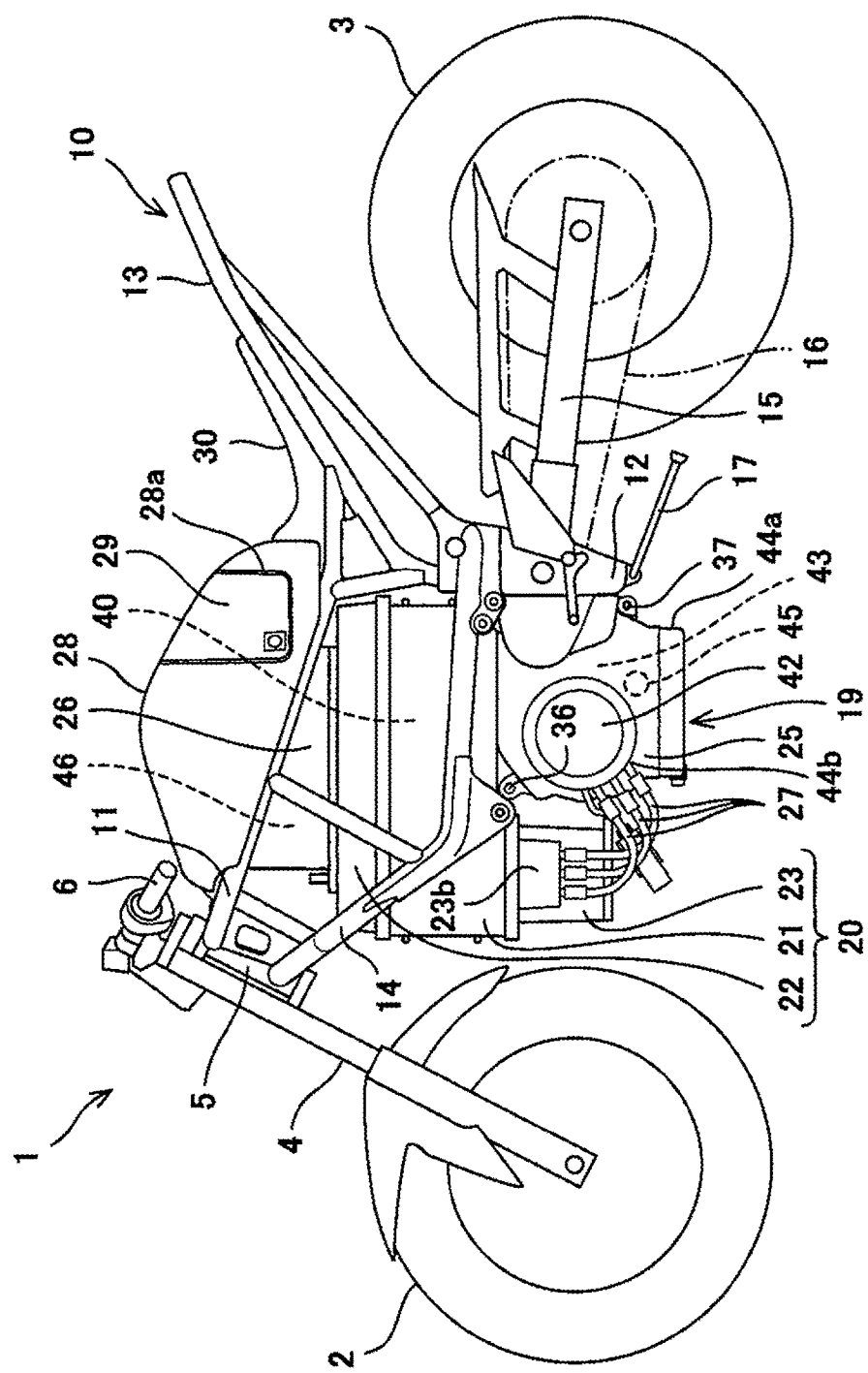
FIG. 1 is a left side view of an electric motorcycle according to an embodiment.
Figure 2:
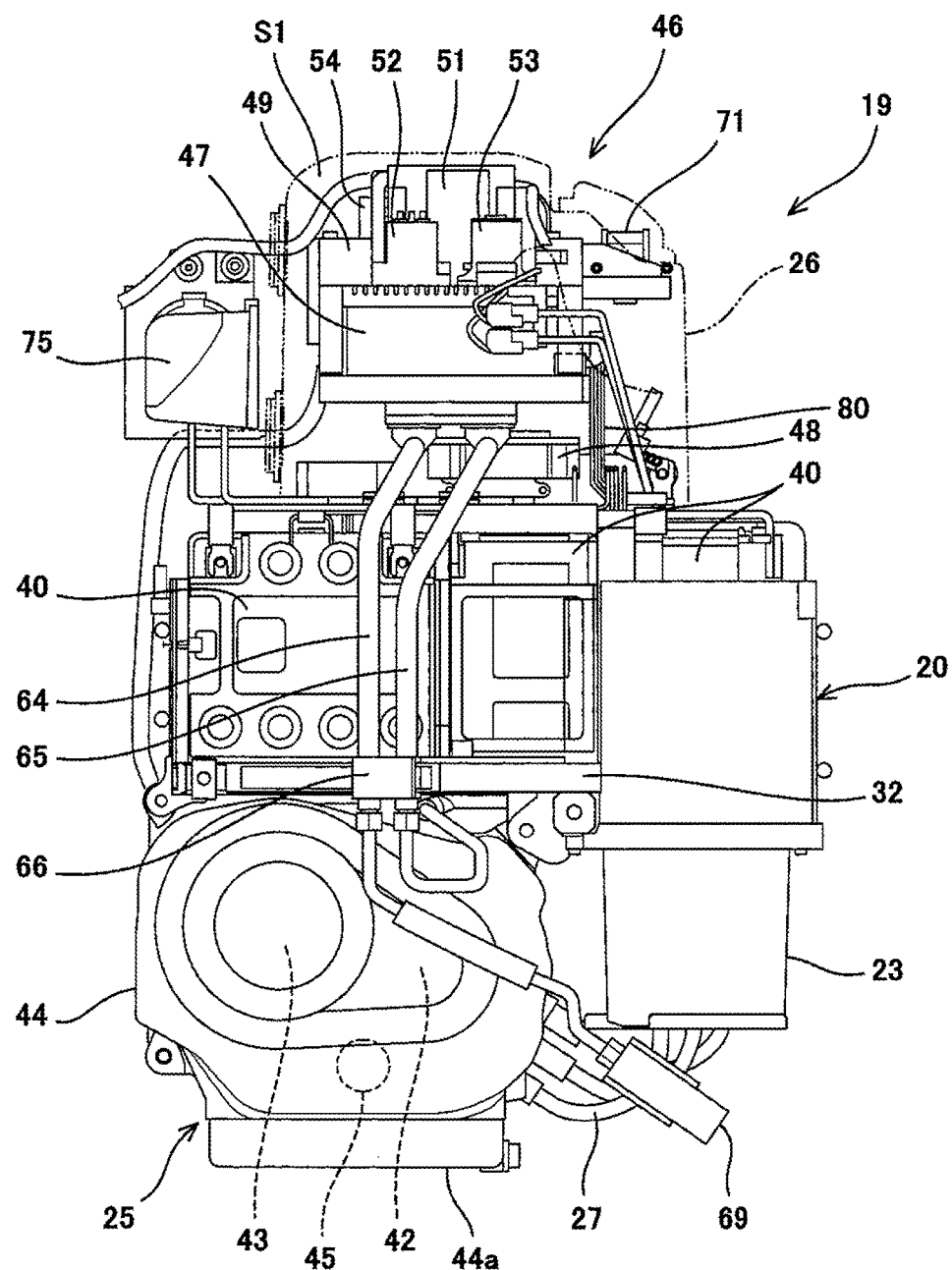
FIG. 2 is a right side view of a power unit of the electric motorcycle of FIG. 1.

FIG. 1 is a left side view of an electric motorcycle 1 according to the embodiment of the present invention. FIG. 2 is a right side view of a power unit 19 of the electric motorcycle 1 of FIG. 1. As shown in FIGS. 1 and 2, the electric motorcycle 1 which is a straddle-type electric vehicle includes a front wheel 2 which is a driven wheel, and a rear wheel 3 which is a drive wheel. The front wheel 2 is rotatably mounted to the lower end portion of a front fork 4. The upper portion of the front fork 4 is integrated with a steering shaft (not shown). The steering shaft is rotatably supported by a head pipe 5 of a vehicle body in a state in which the steering shaft is inserted into the head pipe 5. A bar-type handle 6 extending in a rightward and leftward direction is attached to the steering shaft, and an accelerator grip (not shown) is provided at the right side of the handle 6.

The vehicle body frame 10 of the electric motorcycle 1 includes a pair of right and left main frames 11 extending rearward from the head pipe 5 such that they are inclined slightly downward. A pair of right and left down frames 14 are coupled to the front end portions of the main frames 11, respectively such that the down frames 14 extend downward therefrom, and then rearward. The rear end portions of the main frames 11 are connected to the upper portion of a pivot frame 12 of a frame shape. The front end portion of a swing arm 15 is mounted to the pivot frame 12 such that the swing arm 15 supports the rear wheel 3 and is vertically pivotable. A rear frame 13 is placed above the swing arm 15 and is connected to the rear end portions of the main frames 11. A side stand 17 is placed at the left side of the pivot frame 12. The side stand 17 can be tilted between a use position and a non-use position. In the use position, the side stand 17 supports the vehicle body of the electric motorcycle 1 such that the vehicle body is inclined to the right or to the left (in the present example, to the left).

The vehicle body frame 10 supports the power unit 19 in a space formed between the head pipe 5 and the pivot frame 12. The power unit 19 includes a plurality of batteries 40, an electric motor 42, an inverter 47 (see FIG. 2), and others which are integrated. The plurality of batteries 40 are accommodated into a battery case 20. The battery case 20 includes a middle case 21 which is made of metal and has a tubular shape in which upper and lower sides thereof are opened and the lower end of a rear section is closed, an upper case 22 which is made of a resin and attached to the middle case 21 to close an upper opening in the middle case 21, and a lower case 23 which is made of a resin and attached to the middle case 21 to close a lower opening in the front section of the middle case 21.

A motor unit 25 is mounted to the battery case 20 in a location that is rearward relative to the lower case 23 and below the middle case 21. Specifically, the motor unit 25 is fastened to a frame member 32 of the middle case 21 and the pivot frame 12 by brackets 36, 37. The motor unit 25 includes a casing 44 (motor case), the electric motor 42 accommodated in the casing 44 to generate driving power for moving the vehicle body, a transmission 43 accommodated in the casing 44 to change the speed of a rotational driving power output from the electric motor 42, an oil pan 44a attached to the lower portion of the casing 44, and an oil pump 45 which suctions up and discharges oil stored in the oil pan 44a. The rotational driving power output from the transmission 43 is transmitted to the rear wheel 3 via a chain 16.

An electric component cover 26 is attached to the upper surface of the battery case 20 to form an electric component space accommodating an electric component group 46, together with the upper case 22. The electric component cover 26 is insulative, and is made of, for example, an insulating resin material. The electric component cover 26 is covered by an upper cover 28 which is a dummy tank which looks like a fuel tank of a conventional engine-driven motorcycle. The upper cover 28 is made of, for example, a metal material. The electric component cover 26 is lower in strength than the upper cover 28 is. The rear portion of the upper cover 28 is formed with a connector opening 28a through which a charging connector 75 (see FIG. 5), which will be described later, is exposed. The connector opening 28 is closed by a connector lid member 29. The rear portion of the upper cover 28, corresponding to the connector lid member 29, is smaller in dimension in a vehicle width direction than the center portion of upper cover 28, covering the electric component cover 26. A driver seat 30 supported by the rear frame 13 is placed rearward relative to the upper cover 28. The driver seated on the seat 30 can grip the upper cover 28 with their legs. The upper surface of the battery case 20 is located below the upper end of the seat 30. In this configuration, even when the electric component group 46 including the inverter 47 and the like is placed on the battery case 20, it becomes possible to lessen the amount of the electric component group 46 which protrudes upward from a virtual line connecting the seat 30 to the head pipe 5.

The batteries 40 are placed between the head pipe 5 and the seat 30. At least a portion of the batteries 40 is placed above and forward relative to footrests of the vehicle body, and between the legs of the driver seated on the seat 30. The electric motor 42 is placed between the head pipe 5 and the seat 30. The electric motor 42 is supported on the pivot frame 12 and is configured not to be pivoted together with the swing arm 15. The battery case 20 is positioned between the electric motor 42 and the inverter 47.

The casing 44 of the motor unit 25 is placed inward relative to the peripheral edge of the bottom surface of the battery case 20 when viewed from above, and the inverter 47 is placed inward relative to the peripheral edge of the upper surface of the battery case 20 when viewed from above. This makes it possible to prevent electric cables 27 connecting the inverter 47 to the electric motor 42 from protruding in the forward and rearward direction and the rightward and leftward direction of the battery case 20.

Figure 3:
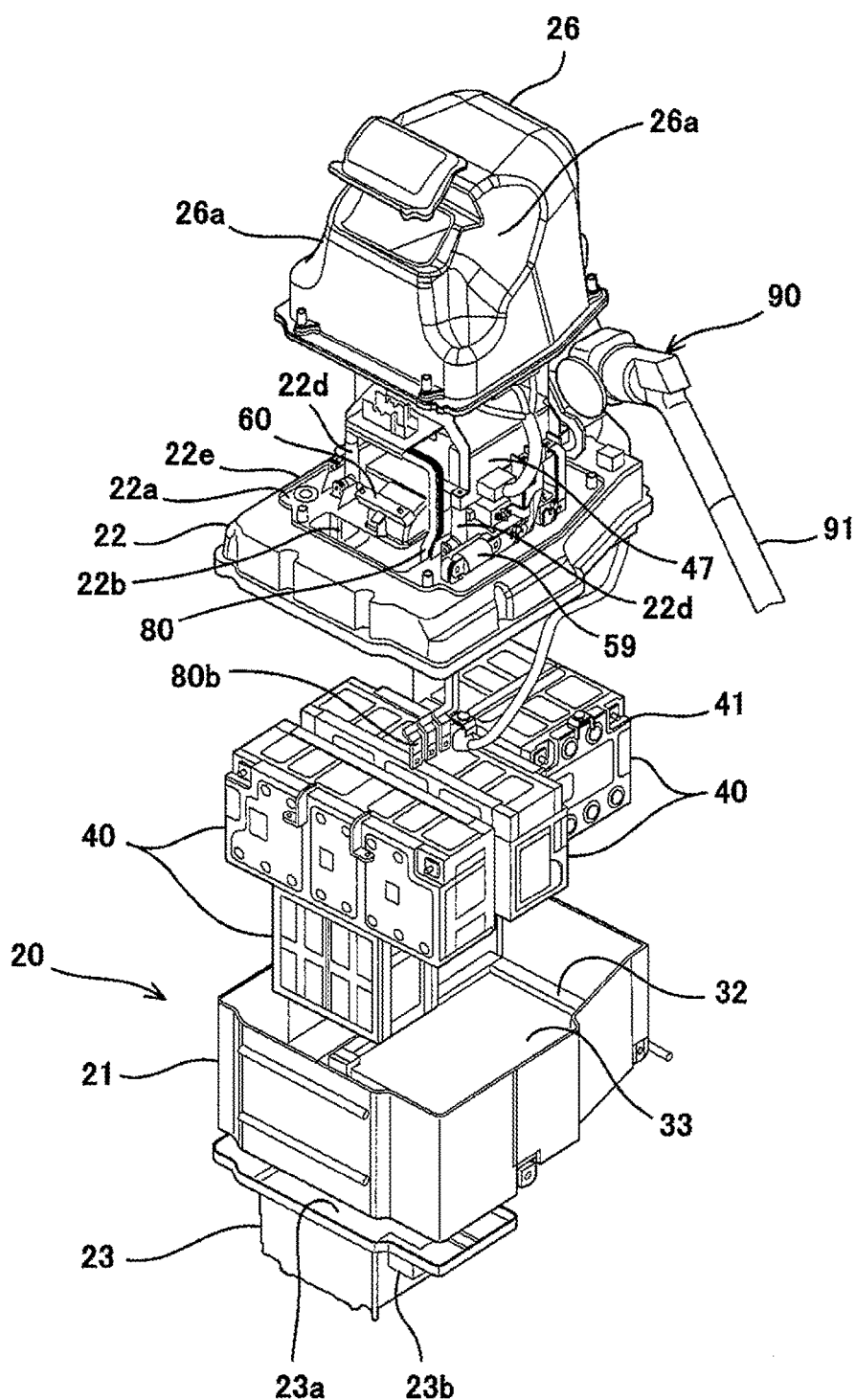
FIG. 3 is an exploded perspective view of the power unit (electric motor device is not shown) of the electric motorcycle of FIG. 1, when viewed from the left and front.
Figure 4:
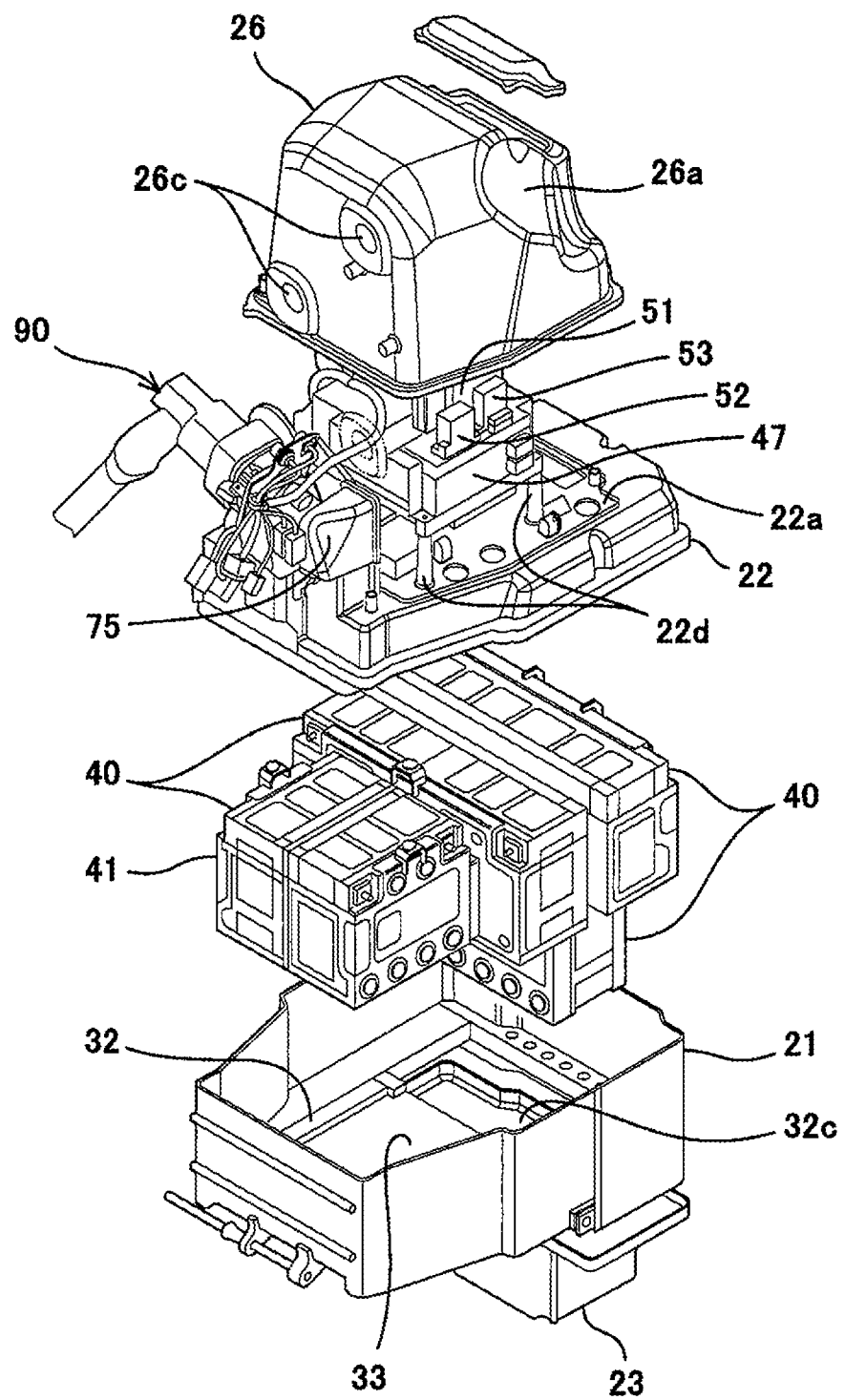
FIG. 4 is an exploded perspective view of the power unit (electric motor device is not shown) of the electric motorcycle of FIG. 1, when viewed from the right and rear.
Figure 5:
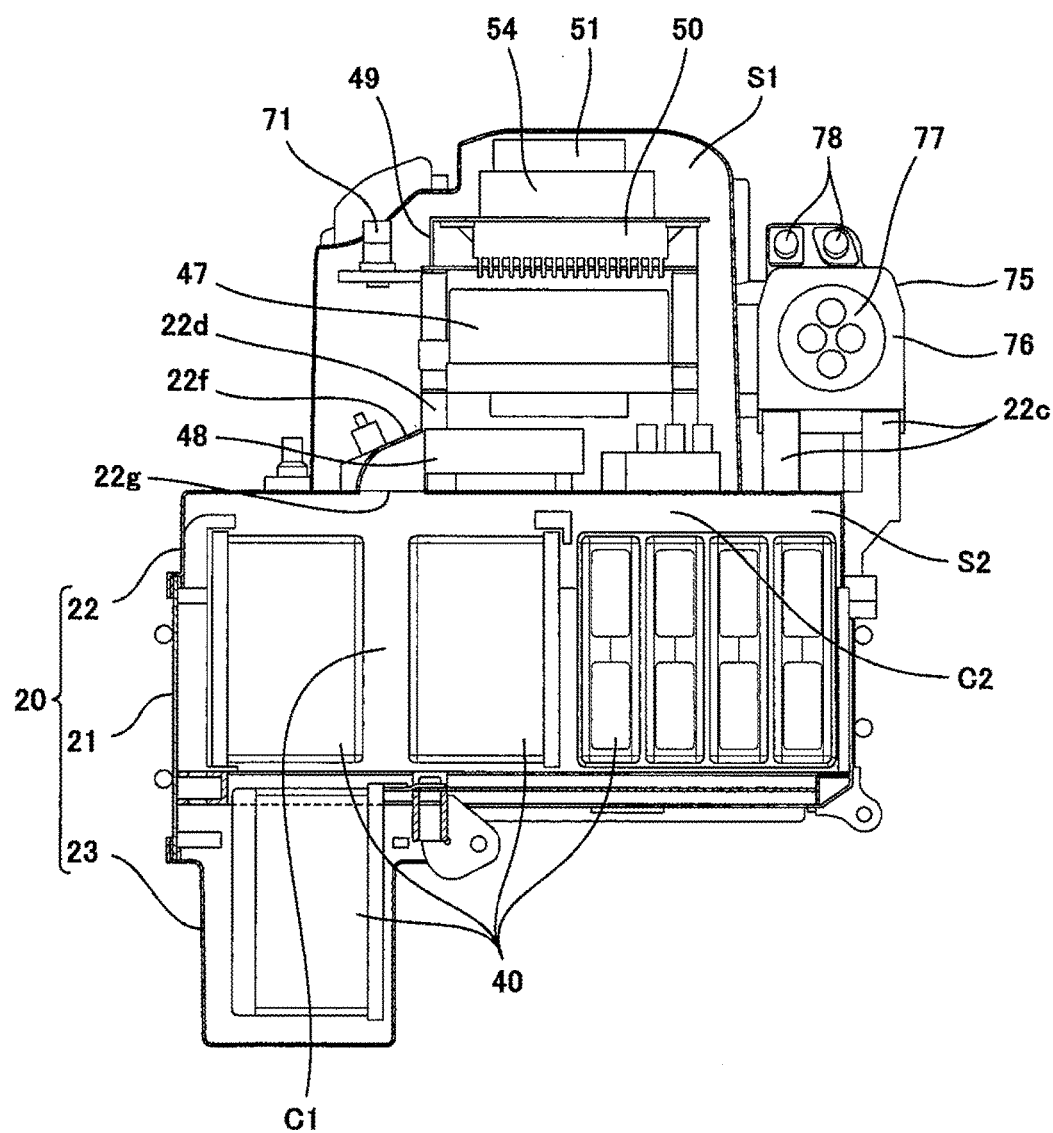
FIG. 5 is a longitudinal sectional view of the power unit (electric motor device is not shown) of the electric motorcycle of FIG. 1, when viewed from the left.
Figure 6:
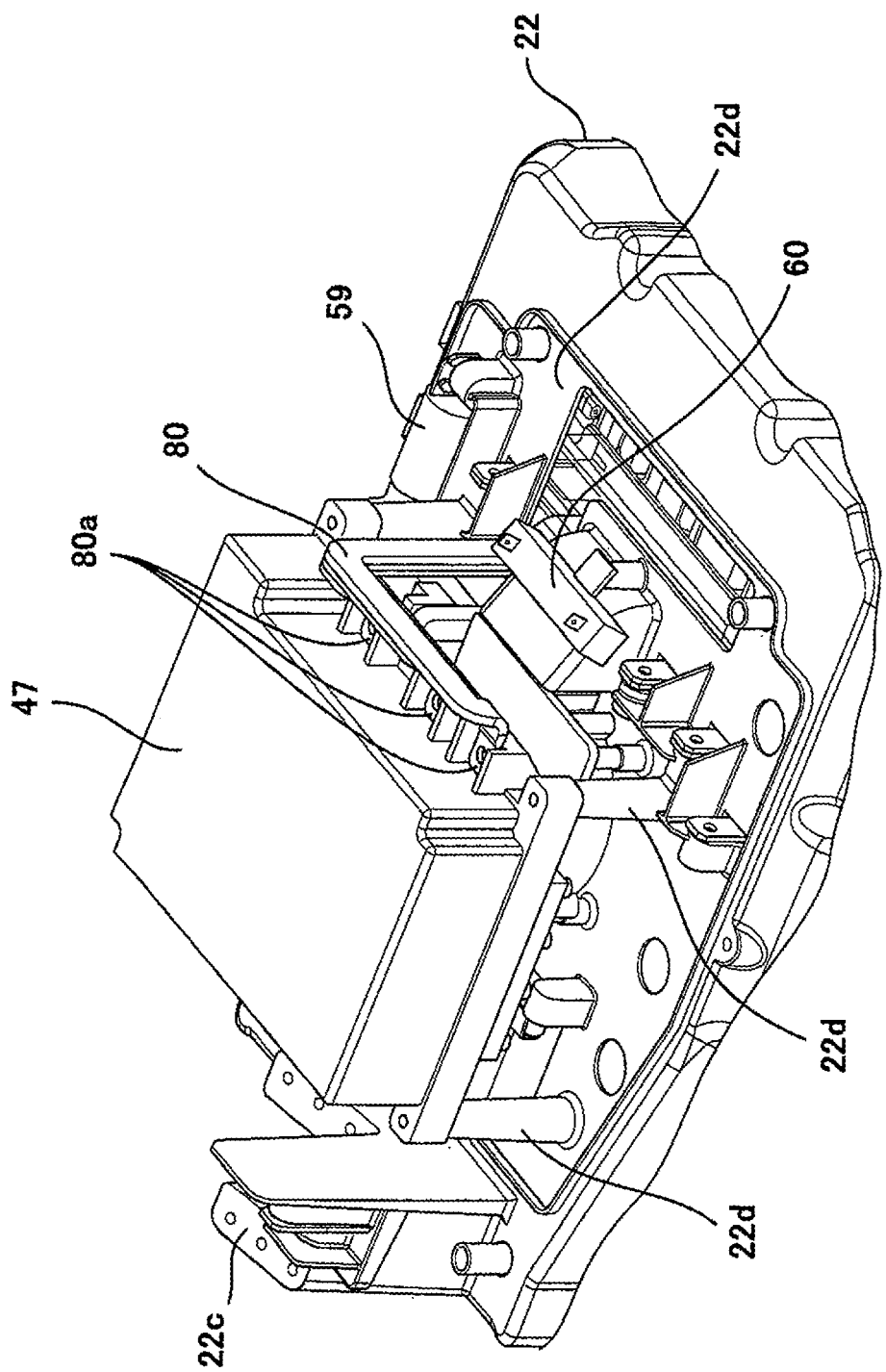
FIG. 6 is a perspective view showing a state in which an ECU, a DC/DC converter, and the like in the region above a battery case of the electric motorcycle of FIG. 1 are detached.
Figure 7:
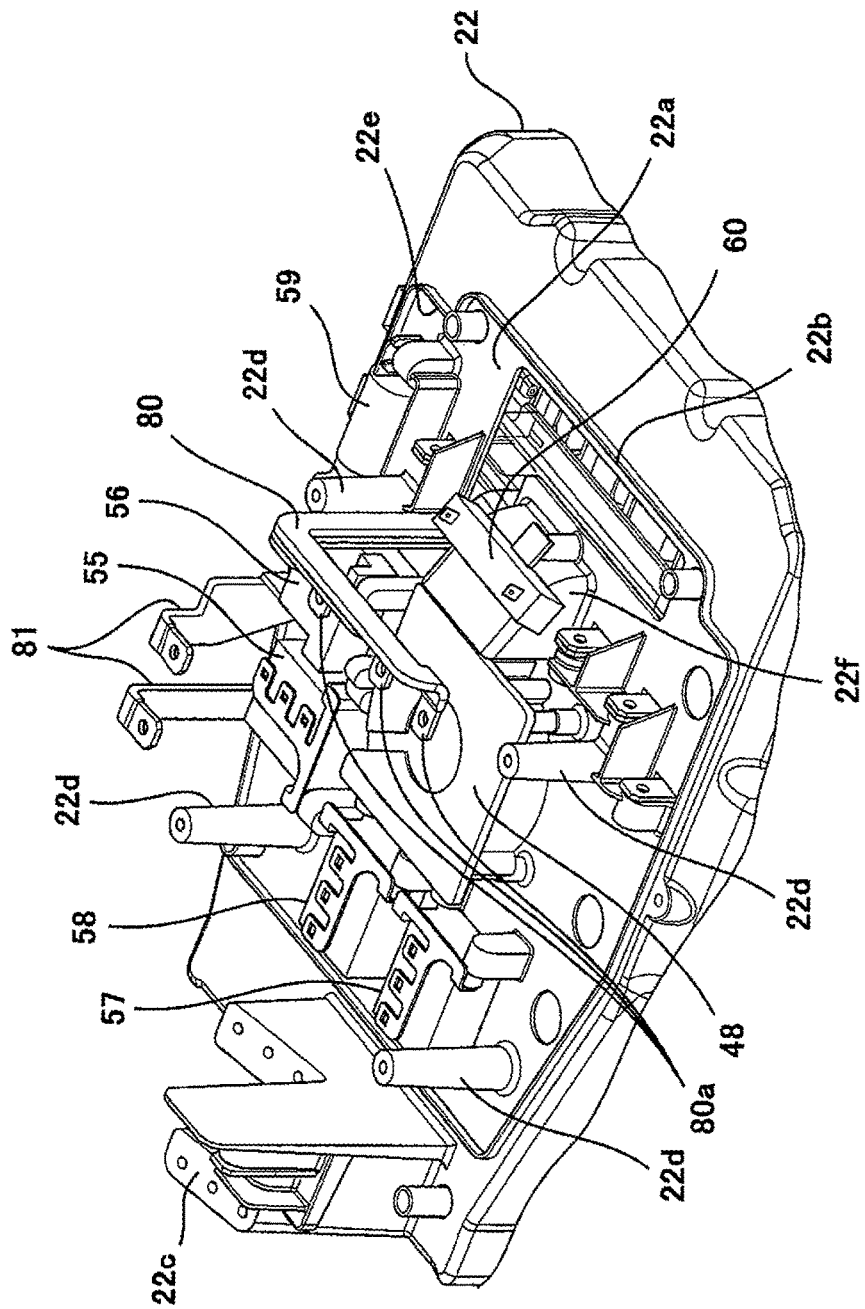
FIG. 7 is a perspective view showing a state in which an inverter and the like in the region above the battery case of FIG. 6 are further detached.

FIG. 3 is an exploded perspective view of the power unit 19 (the motor unit 25 is not shown) of the electric motorcycle 1 of FIG. 1, when viewed from the left and front. FIG. 4 is an exploded perspective view of the power unit 19 (the motor unit 25 is not shown) of the electric motorcycle 1 of FIG. 1, when viewed from the right and rear. FIG. 5 is a longitudinal sectional view of the power unit 19 (motor unit 25 is not shown) of the electric motorcycle 1 of FIG. 1, when viewed from the left. FIG. 6 is a perspective view showing a state in which an ECU 54, a DC/DC converter 50, and the like in the region above the battery case 20 of the electric motorcycle of FIG. 1 are detached. FIG. 7 is a perspective view showing a state in which the inverter 47 and the like in the region above the battery case 20 of FIG. 6 are further detached.

As shown in FIGS. 2 to 5, the plurality of batteries 40 storing a DC power to be supplied to the electric motor 42 are aligned in a battery space S2 in the interior of the battery case 20. The plurality of batteries 40 are integrated by a casing 41 as an assembly which form a battery group. The group of the batteries 40 is placed in such a manner that its front portion has a larger width than its rear portion in the vehicle width direction (rightward and leftward direction). This makes it possible to prevent an increase in the vertical dimension of the whole of the batteries 40, while increasing the capacity of the whole of the batteries 40. Correspondingly, each of the middle case 21 and the upper case 22 is configured in such a manner that its front portion has a larger width than its rear portion. This allows the driver seated on the seat 30 to easily grip the battery case 20 with their legs.

The rear region of the region of the middle case 21, which is surrounded by the frame member 32, is closed by a bottom plate 33 made of metal, which is fastened to the frame member 32 by welding, while the front region of the region of the middle case 21, which is surrounded by the frame member 32, forms an opening 32c which is in communication with the inner space of the lower case 23. In the interior of the middle case 21 and the upper case 22, the plurality of batteries 40 are accommodated and placed on the frame member 32 and the bottom plate 33. The batteries 40 are also accommodated in the interior of the lower case 23. In other words, the middle case 21 and the upper case 22 constitute an upper battery accommodating section, while the lower case 23 constitutes a lower battery accommodating section. The lower case 23 as the lower battery accommodating section is shorter in length in the forward and rearward direction than the middle case 21 and the upper case 22 as the upper battery accommodating section, and is connected to the front lower portion of the middle case 21. The motor unit 25 is placed immediately behind the lower case 23 and immediately below the middle case 21.

In other words, the electric motor 42 is placed below the battery case. In the present embodiment, more specifically, the electric motor 42 is placed below the rear portion of the battery case 20 and rearward relative to the front portion of the battery case 20. The front portion of the battery case 20 protrudes downward. The upper surface of the electric motor 42 is placed above the lowermost surface of the battery case 20. The front surface of the electric motor 42 is placed forward relative to the rearmost surface of the battery case 20. This allows the batteries 40 and the electric motor 42 to be close to each other, and the lower end of the battery case 20 to be located as low as possible. The terminal block of the electric motor 42 is placed below the upper surface of the batteries 40, and at least a portion of an electric wire connecting the inverter 47 to the electric motor 42 runs through the interior of the battery case 20.

The upper surface of the upper case 22 of the battery case 20 is formed with an electric component region 22a surrounded by a peripheral rib 22e. The electric component cover 26 is placed over the upper surface of the upper case 22 along the peripheral rib 22e, thereby forming an electric component space S1. The electric component cover 26 is formed with a recess 26a corresponding to a recess 28d of the upper cover 28. In the electric component space S1, the electric component group 46 is placed. In other words, the electric component group 46 is placed above the batteries 40 to overlap with the batteries 40 when viewed from above. The electric component group 46 includes electric components associated with a high-voltage current of the batteries 40, through which the high-voltage current flows. For example, the electric component group 46 includes at least one of the inverter 47 (switching device), the DC/DC converter 50 (transformer), a ground leakage sensor 51, a DC/DC converter relay 52, a varistor 53, a discharging relay 55, a charging relay 57, a fuse 59, a precharge resistor 60, and a service plug 71. In the present example, the electric component group 46 includes all of the inverter 47, the DC/DC converter 50, the ground leakage sensor 51, the DC/DC converter relay 52, the varistor 53, the discharging relay 55, the charging relay 57, the fuse 59, the precharge resistor 60, and the service plug 71. Further, the electric component group 46 may include electric components associated with a low-voltage current. In the present example, the electric component group 46 includes a fan 48 and the ECU 54 (control device). Between the motor unit 25 and the inverter 47, oil as a cooling medium is circulated via cooling medium pipes 64, 65, the oil pump 45, an oil cooler 69, etc., to cool the inverter 47 and the electric motor 42.

The upper case 22 of the battery case 20 is provided with a seat section 22c protruding upward from the upper surface thereof, in a location that is rearward relative to the electric component cover 26. The charging connector 75 is mounted on the seat section 22c, to charge the batteries 40 with the electric power supplied externally. More specifically, the charging connector 75 is integrated with the battery case 20 outside of the battery case 20 to constitute a portion of the power unit 19. The charging connector 75 is placed above the batteries 40 to overlap with the batteries 40 when viewed from above. The rear wall portion of the electric component cover 26 is formed with an insertion hole 26c. The electric wire extending from the charging connector 75 is guided to the electric component space S1 through the insertion hole 26c. The charging connector 75 is provided with a connector connection surface 76 to which a power supply connector 90 of an L-shape connected to an outside power supply via a cable 91 is connected. The connector connection surface 76 faces a vehicle width direction (in the present example, leftward). The connector connection surface 76 is provided with a quick charging connector 77 and a normal charging connector 78. The quick charging connector 77 and the normal charging connector 78 are arranged at upper and lower sides, respectively.

As shown in FIGS. 5 and 7, the fan 48 is mounted to the center portion of the electric component region 22a provided in the upper surface of the upper case 22 of the battery case 20. The upper wall of the upper case 22 is formed with an air inlet 22g via which the electric component space S1 is in communication with the battery space S2. The fan 48 causes the air to flow from the interior of the electric component space S1 into the battery space S2 through the air inlet 22g. The upper case 22 is formed with a duct member 22f defining an air passage connecting the discharge outlet of the fan 48 to the air inlet 22g.

As shown in FIG. 5, in the battery space S2 in the interior of the battery case 20, the batteries 40 are placed to be spaced from each other in the forward and rearward direction, to form a cooling passage C1 extending vertically, immediately below the air inlet 22g. The batteries 40 are integrated as an assembly by the casing 41. A space formed between the batteries 40 extends in the direction in which the air flows into the battery space S2, at a location where the air flows into the battery space S2 through the air inlet 22g. This space is made larger than the other spaces formed between the batteries 40. This space is used as the cooling passage C1. In addition, a space is formed between the batteries 40 and the battery case 20 and used as a cooling passage C2.

As shown in FIG. 7, in a region of the electric component region 22a, the pair of discharging relays 55, 56 are mounted on a current supply path connecting the batteries 40 to the inverter 47, and the pair of charging relays 57, 58 are mounted on a current supply path connecting the charging connector 75 to the batteries 40. In another region of the electric component region 22, the fuse 59 provided in a power supply circuit and the precharge resistor 60 are mounted. From the electric component region 22a, a plurality of support elements 22d on which the inverter 47 is to be mounted protrude upward. The electric component region 22a is provided with a pair of bus bars 81 which are electric wires (power lines) protruding upward and electrically connected to the batteries 40 via the discharging relays 55, 56, the fuse 59, the precharge resistor 60, and the like. A first bus bar module 80 (see FIG. 8) protrudes upward from the battery space S2 through an opening 22b formed in the electric component region 22a. The first bus bar module 80 includes three bus bars 94 to 96 (see FIG. 9) stacked together, insulatively bonded together and integrated, which are electric wires used to supply a three-phase AC current from the inverter 47 to the electric motor 42. Thus, the bus bar module 80 can be easily handled, and generation of noise can be suppressed.

As shown in FIG. 6, the inverter 47 is mounted on the support elements 22d. The inverter 47 is placed above the upper case 22 to form a slight gap with the upper surface of the upper case 22, and fastened to the battery case 20. Since heat generated in the inverter 47 travels upward, it becomes possible to prevent heat generated in the inverter 47 from being transferred to the batteries 40. Because of the vertical gap formed between the inverter 47 and the battery case 20, heat transfer to the batteries 40 can be prevented more effectively. The inverter 47 is configured to convert the DC power supplied from the batteries 40 (see FIG. 3) into AC power and supply the AC power to the electric motor 42 (see FIG. 3), and includes a semiconductor switching element.

The inverter 47 is placed above the batteries 40 to overlap with the battery case 20 when viewed from above. The inverter 47 is placed above the battery case 20 to be included within the battery case 20 when viewed from above. The inverter 47 has a flat shape in which a vertical dimension is smaller than a dimension in the forward and rearward direction and a dimension in the rightward and leftward direction. The inverter 47 is placed inward relative to the front and rear edges and right and left edges of the assembly of the battery case 20 and the batteries 40 when viewed from above.

The inverter 47 is placed above the fan 48, the discharging relays 55, 56, and the charging relays 57, 58 to overlap with the fan 48, the discharging relays 55, 56, and the charging relays 57, 58 when viewed from above. In other words, the fan 48, the discharging relays 55, 56, and the charging relays 57, 58 are placed between the battery case 20 and the inverter 47. In this structure, many electric components can be placed in the electric component region 22a with a small area, and the electric wires or the like connecting them to each other, and the electric wires or the like connecting them to the batteries 40, can be reduced in length.

As shown in FIG. 5, an electromagnetic shield member 49 formed by bending a metal plate is placed over the inverter 47. The electromagnetic shield member 49 is electrically grounded at a ground potential equal to that of the electric components in a weak electric system. The electromagnetic shield member 49 has a step shape and is placed on the inverter 47 to correspond to the support elements 22d. The electromagnetic shield member 49 supports a plurality of electric components. On the upper surface of the electromagnetic shield member 49 with a step shape, for example, the ECU 54 for controlling the ground leakage sensor 51, the DC/DC converter relay 52, the varistor 53, the inverter 47, the relays 52, 55 to 58, etc., are mounted. On the lower surface of the electromagnetic shield member 49, the DC/DC converter 50 is mounted such that the DC/DC converter 50 forms a gap with the inverter 47. In other words, the electromagnetic shield member 49 is interposed between the DC/DC converter 50 and the ECU 54 to isolate them from each other. In this structure, the electromagnetic shield member 49 shields electromagnetic noise generated from the DC/DC converter 50 and the inverter 47 and thereby prevents the noise from being transmitted to the ECU 54. In other words, since the electric components in the weak electric system (the ECU, the sensors, etc.) are placed above the electric components in the strong electric system (the inverter, the DC/DC converter, etc.) with the metal plate interposed between the electric components in the weak electric system and the electric components in the strong electric system, space-saving can be achieved while preventing influence of the electromagnetic noise on the electric components in the weak electric system. As defined herein, a voltage equal to the voltage (e.g., 200V) of the batteries 40 connected in series is to be applied to the electric components in the strong electric system, while a voltage (e.g., 12V) lower than the voltage of the battery group 40 is to be applied to the electric components in the weak electric system, which, for example, input, output and/or calculate control signals, etc.

The electric component group 46 placed above the battery case 20 is configured such that the electric components are placed in a plurality of layers and arranged vertically to overlap with each other when viewed from above. In the present embodiment, the inverter 47 is placed above the fan 48, the discharging relays 55, 56 and the charging relays 57, 58, to overlap with the fan 48, the discharging relays 55, 56 and the charging relays 57, 58, when viewed from above, the DC/DC converter 50 is placed above the inverter 47 to overlap with the inverter 47 when viewed from above, the ECU 54 is placed above the DC/DC converter 50 to overlap with the DC/DC converter 50, when viewed from above, the ground leakage sensor 51, the DC/DC converter relay 52, and the varistor 53 are placed above the inverter 47 to overlap with the inverter 47 when viewed from above, and laterally relative to the ECU 54.

Figure 8:
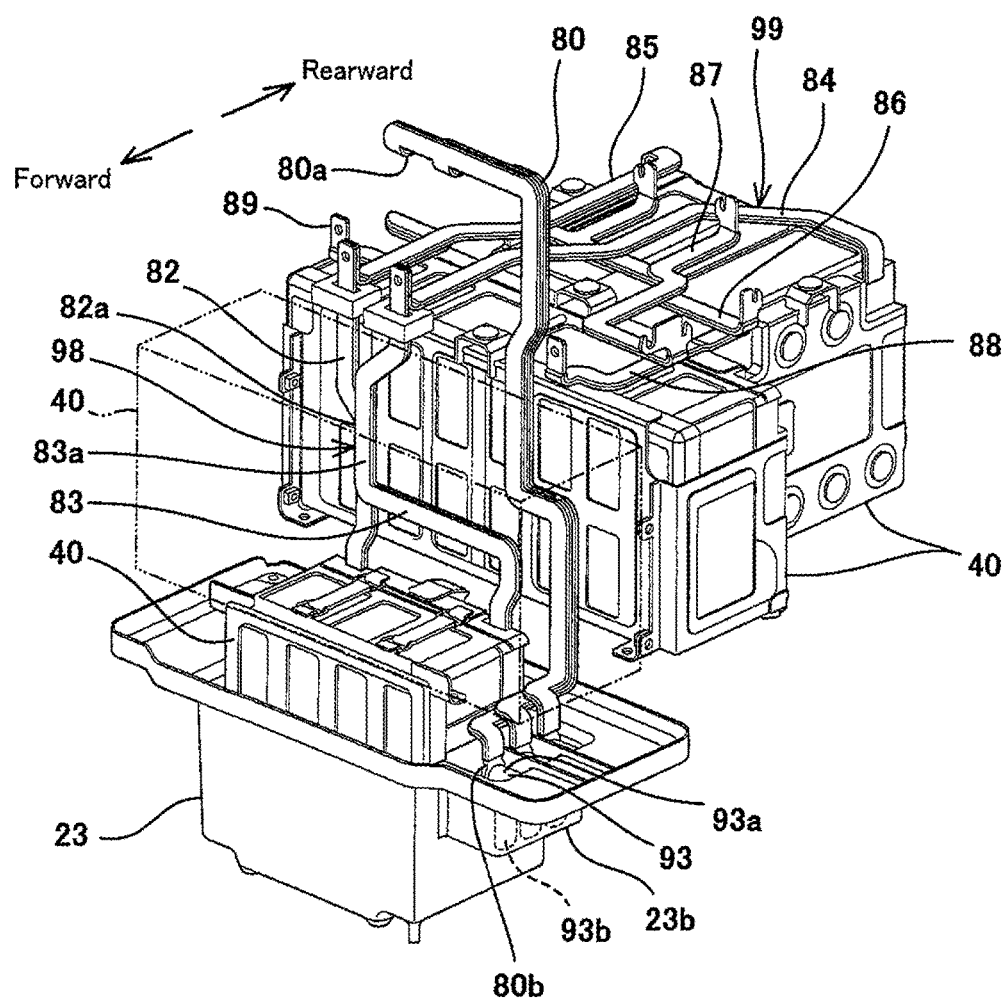
FIG. 8 is a perspective view of major components for explaining a bus bar module in the interior of the battery case of the electric motorcycle of FIG. 1.

FIG. 8 is a perspective view of major components for explaining bus bar modules 80, and bus bars 82 to 85 in the interior of the battery case 20 of the electric motorcycle 1 of FIG. 1. As shown in FIGS. 1, 3, 6, and 8, the first bus bar module 80 as a portion of the electric wire (power line) connecting the electric motor 42 (see FIG. 1) to the inverter 47 vertically runs through the interior space of the battery case 20 (see FIG. 4). Terminal sections 80b at the lower end portion of the first bus bar module 80 are placed in a terminal accommodating section 23b (terminal box) of the lower case 23. Between the terminal sections 80b in the terminal accommodating section 23b and the terminal section (not shown) of the electric motor 42 accommodated in the terminal block 44b of the motor unit 25, the three high-voltage electric cables 27 (see FIG. 1) are placed to couple the terminal sections in a location outside of the battery case 20. In this case, since the lower case 23 including the terminal accommodating section 23b and the electric motor 42 are adjacent to each other in the forward and rearward direction, the high-voltage electric cables 27 exposed to the outside can be reduced in length. Thus, the electric wire connecting the inverter 47 to the electric motor 42 includes the first bus bar module 80 and the electric cables 27, and a portion of the first bus bar module 80 constitutes a running portion vertically running through the interior space of the battery case 20.

As shown in FIG. 1, the electric cables 27 are located between the seat 30 and the batteries 40 and spaced apart from the seat 30. More specifically, the seat 30 is placed above and rearward relative to the battery case 20, while the terminal accommodating section 23b of the battery case 20 to which one end portions of the electric cables 27 are connected is placed on the front lower portion of the battery case 20. The terminal block 44b provided on the casing 44 of the electric motor 42 is placed to face downward.

Figure 9:
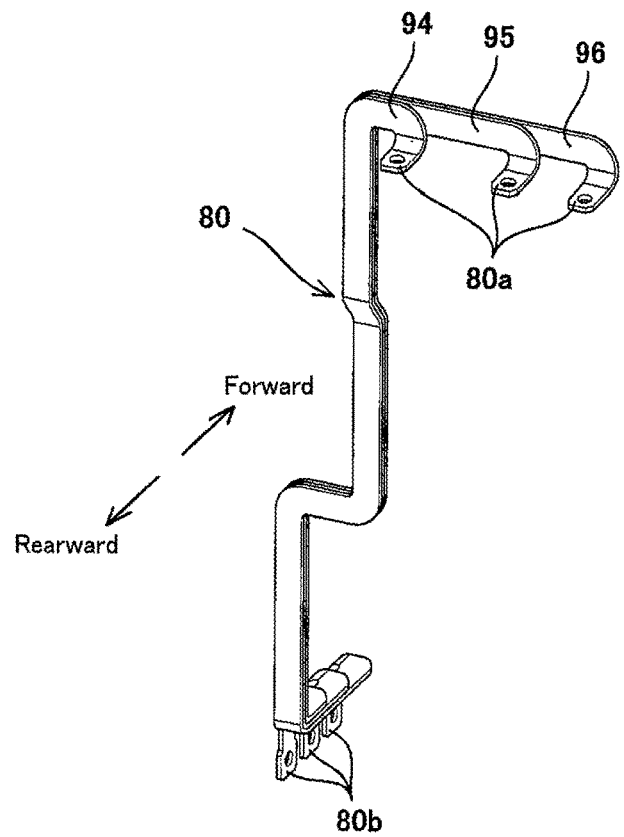
FIG. 9 is a perspective view of a first bus bar module of FIG. 8.

FIG. 9 is a perspective view of the first bus bar module 80 of FIG. 8. As shown in FIGS. 8 and 9, the first bus bar module 80 includes the three bus bars 94 to 96 for a three-phase AC current which are stacked together, insulatively bonded together, and preliminarily integrated. The end portions of the three bus bars 94 to 96 are bent such that their terminal ends are at different positions. The terminal sections 80a of the first bus bar module 80 which are closer to the inverter 47 are aligned, while the terminal sections 80b of the first bus bar module 80 which are closer to electric motor 42 are aligned. The direction in which the terminal sections 80a are aligned and the direction in which the terminal sections 80b are aligned are different and orthogonal to each other. The vertically extending portions of the three bus bars 94 to 96 are stacked in the direction (forward and rearward direction) in which the terminal sections 80b are aligned. In the straddle-type vehicle, the dimension of the vehicle body in the rightward and leftward direction is small. In view of this, at least either the terminal sections 80a or the terminal sections 80b of the first bus bar module 80 are preferably aligned in the forward and rearward direction.

The upper portion of the first bus bar module 80 which is provided with the three terminal sections 80a protrudes upward from the battery case 20, and the terminal sections 80a are connected to the output terminal of the inverter 47. The first bus bar module 80 runs through the space (cooling passage C1) formed between the battery 40 on a first row from a front and the battery 40 on a second row from the front, among the batteries 40 arranged in three rows in the forward and rearward direction. In other words, the first bus bar module 80 is placed in the front portion of the assembly of the batteries 40. Since the first bus bar module 80 as the electric wire connecting the inverter 47 to the electric motor 42 runs through the interior (i.e., cooling passage C1) of the assembly of the batteries 40, the first bus bar module 80 can be protected, as compared to a case where the first bus bar module 80 is placed between the battery case 20 and the batteries 40. In the present embodiment, the first bus bar module 80 runs through the space formed between the batteries 40 aligned in the forward and rearward direction, and through the space that is inward relative to the right and left ends of the assembly of the batteries 40 in the rightward and leftward direction. Therefore, the first bus bar module 80 can be protected suitably.

Since the battery case 20 is provided with the terminal accommodating section 23b (terminal box) for electrically connecting the first bus bar module 80 to the electric cables 27 (see FIG. 1), an assembling operation can be performed more easily, than in a case where the first bus bar module 80 is directly connected to the electric cables 27. Specifically, the terminal accommodating section 23b accommodates an electric conductor 93 including bus bar terminal sections 93a connected to the terminal sections 80b of the first bus bar module 80 and cable terminal sections 93b connected to the electric cables 27 (see FIG. 1). The bus bar terminal sections 93a lead inward of the battery case 20, while the cable terminal sections 93b lead outward of the battery case 20.

The terminal accommodating section 23b is located inward relative to the front, rear, right, and left outer edges of the battery case 20 when viewed from above. In this structure, for example, when the vehicle body falls, a portion of the battery case 20 which is other than the terminal accommodating section 23b collides with an obstacle first, and as a result, the terminal accommodating section 23b is protected. Also, the terminal accommodating section 23b is located above the lowermost end of the group of the batteries 40. Therefore, when the vehicle body falls, the lowermost end of the battery case 20 collides with an obstacle before the terminal accommodating section 23b collides with the obstacle, and as a result, the terminal accommodating section 23b is protected.

Figure 10:
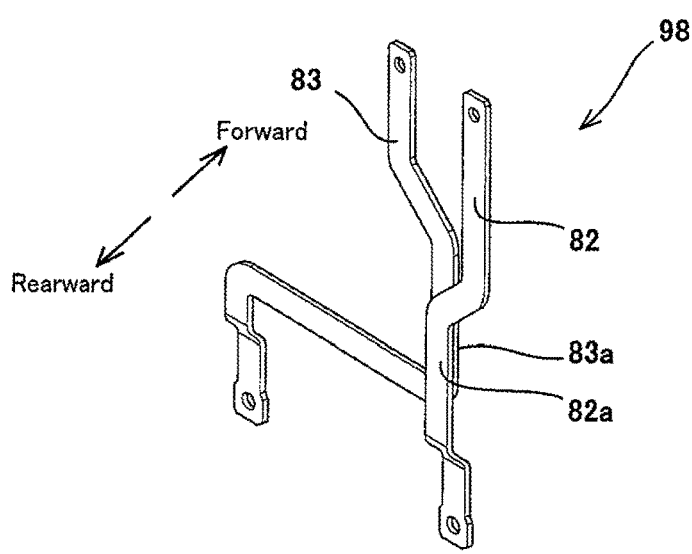
FIG. 10 is a perspective view of a second bus bar module of FIG. 8.

FIG. 10 is a perspective view of a second bus bar module 98 of FIG. 8. As shown in FIGS. 8 and 10, the plurality of bus bars 82, 83 connecting the batteries 40 accommodated in the lower case 23 to the batteries 40 accommodated in the middle case 21 (see FIG. 3) are configured such that the surfaces of intermediate portions 82a, 83a thereof are joined to each other via an insulating material, and thereby the second bus bar module 98 is integrated. In this structure, a virtual line connecting one end portion of the bus bar 82 to the other end portion of the bus bar 82 and a virtual line connecting one end portion of the bus bar 83 to the other end portion of the bus bar 83 do not cross each other. Therefore, the bus bars 82, 83 are bent to allow the intermediate portions 82a, 83a to contact each other.

Figure 11:
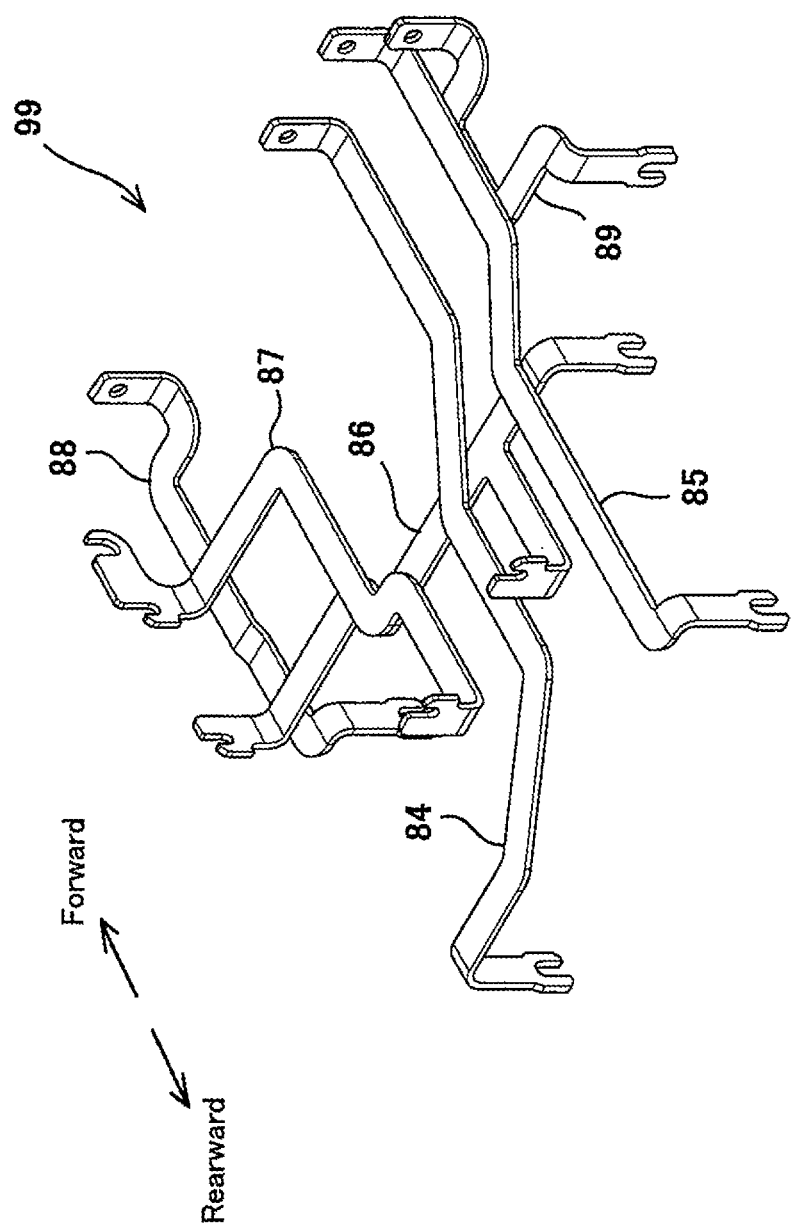
FIG. 11 is a perspective view of a third bus bar module of FIG. 8.

FIG. 11 is a perspective view of a third bus bar module 99 of FIG. 8. As shown in FIGS. 8 and 11, bus bars 84 to 89 for directly connecting the batteries 40 to each other are placed in a space formed between the group of the batteries 40 and the upper wall (upper wall of the upper case 22) of the battery case 20 (see FIG. 5). The plurality of bus bars 84 to 89, are configured such that the surfaces of intermediate portions thereof close to each other are joined to each other via an insulating material, to form the third bus bar module 99.

The batteries 40 accommodated in the battery case 20 are electrically interconnected in series, via the bus bars 82 to 89 of the second bus bar module 98 and the third bus bar module 99. The positive terminal and negative terminal at the terminal ends of the group of the batteries 40 connected in series are connected to the bus bars 81 (see FIG. 7) provided in the electric component space to be connected to the inverter 47.

As described above, the first to third bus bar modules 80, 98, 99 are a plurality of sub-assemblies each of which includes a plurality of bus bars which are integrated. Therefore, the many bus bars 82 to 89, 94 to 96 are mounted more efficiently.

The first bus bar module 80 and the second bus bar module 98 run through the cooling passages C1, C2 (see FIG. 5), in the battery space S2 in the interior of the battery case 20. In other words, the cooling passages C1, C2 with a relatively large dimension to cool the batteries 40 are used as the accommodating space in which the bus bars 82, 83, 94 to 96 are accommodated. The air blown by the fan 48 is introduced into the battery case 20 through the air inlet 22g, takes heat out of the batteries 40 and the bus bars 82, 83, 94 to 96 while flowing through the cooling passages C1, C2, and is thereafter discharged to outside of the battery case 20 through an air outlet (not shown) provided on the battery case 20.

In accordance with the above-described configuration, since the electric wire (first bus bar module 80) connecting the inverter 47 to the electric motor 42 runs through the interior space of the battery case 20, this electric wire can be easily protected from the outside and the space efficiency can be increased. In addition, since the electric wire which is the first bus bar module 80 can be covered by the battery case 20, the external appearance of the electric vehicle can be improved. Furthermore, since the battery case 20 is interposed between the electric motor 42 and the inverter 47 in the vertical direction, a distance from the batteries 40 to the inverter 47 and a distance from the batteries 40 to the electric motor 42 can be reduced, and the first bus bar module 80 which is the electric wire connecting the inverter 47 to the electric motor 42 is allowed to run through the interior of the battery case 20, which can reduce the length of the first bus bar module 80. Moreover, since the inverter 47 is adjacent to the battery case 20, the electric wire extending to outside of the battery case 20 can be reduced.

The electric wire connecting the inverter 47 to the electric motor 42 includes the first bus bar module 80, as the running portion vertically running through the internal space of the battery case 20, and the three electric cables 27 for a three-phase AC current connecting the first bus bar module 80 to the electric motor 42 are provided between the lower portion of the battery case 20 and the casing 44 of the electric motor 42 to couple the battery case 20 and the electric motor 42 to each other. In this configuration, even when the inverter 47 and the electric motor 42 are placed to be vertically spaced apart from each other with the battery case 20 interposed between the inverter 47 and the electric motor 42, the three high-voltage electric cables 27 which have a large cross-sectional area and are not easily bent can be reduced in length and a wiring operation can be easily performed, as compared to a case where the electric wire connecting the inverter 47 to the electric motor 42 runs through a region outside of the case 20.

Since the three bus bars 94 to 96 for a three-phase AC current constitute the first bus bar module 80 by joining together their surfaces via the insulating material, the three bus bars 94 to 96 for a three-phase AC current can be accommodated in a compact manner in the limited space S2 in the interior of the battery case 20, and can be handled more easily during assembly. In addition, since the three bus bars 94 to 96 for a three-phase AC current are joined to each other via the insulating material, it becomes possible to prevent a situation in which a noise generated in one of the bus bars 94 to 96 affects the remaining bus bars of the bus bars 94 to 96.

The first bus bar module 80 includes a portion extending through the interior of the battery case 20 and through the opening 22b on the upper surface of the battery case 20, and protruding upward. This portion is connected to the inverter 47 placed on the upper portion of the battery case 20. Therefore, the electric components such as the inverter 47 can be mounted later to the upper portion of the battery case 20 which is closed. The first to third bus bar modules 80, 98, 99 run through the cooling passages C1, C2 in the battery space S2 in the interior of the battery case 20. In this configuration, the space reserved to cool the batteries 40 is used as the space reserved to allow the electric wires (bus bars) to run therethrough, and as a result, the size of the battery case 20 is not increased. The air flowing through the cooling passages C1, C2 takes heat out of the first to third bus bar modules 80, 98, 99, as well as the batteries 40, and thereby an increase in the electric resistances in the first to third bus bar modules 80, 98, 99 can be suppressed.

The terminal block of the inverter 47 and the terminal block of the electric motor 42 are placed inward relative to the front, rear, right, and left edges of the assembly of the batteries 40 and of the battery case 20. Therefore, the electric wires can be placed inward relative to the contour of the battery case 20, when viewed from above, to electrically connect the inverter 47 to the electric motor 42. Since the electric component group 46 is placed outside of the battery case 20, maintenance for the electric component group 46 can be performed more easily without a need to open the battery case 20.

Since the electric component group 46 including the inverter 47 is placed on the upper case 22 detachably mounted to the middle case 21 of the battery case 20, assembly of the power unit 19 can be carried out more easily in a state in which the electric components are mounted to the upper case 22 as a sub-assembly. When the battery case 20 is detached from the vehicle body, the electric component group 46 can be detached from the vehicle body together with the batteries 40. This allows an operator to easily check the operation of the batteries 40 in the state in which the batteries 40 are detached from the vehicle body before or after shipping.

Since the electric component group 46 is placed above the batteries 40, assembly of the electric component group 46 can be carried out more easily than in a case where the electric components are placed below the batteries 40. Since the electric component group 46 including the inverter 47 is placed on the upper case 22 detachably mounted to the middle case 21 of the battery case 20, assembly can be carried out more easily in a state in which the electric component group 46 is mounted to the battery case 20 as a sub-assembly. When the battery case 20 is detached from the vehicle body, the electric component group 46 can be detached from the vehicle body together with the batteries 40. This allows the operator to easily check the operation of the batteries 40 and the like, in the state in which the batteries 40 are detached from the vehicle body before or after shipping.

The electric cables 27 are placed on the same side (in the present example, left side) with respect to the vehicle body as the side where the side stand 17 is placed. Therefore, when the side stand 17 is placed in the use position and the vehicle body is made to independently stand in the inclined state, the electric cables 27 are not seen easily and thereby the external appearance of the electric vehicle can be improved. Since the middle case 21 is made of metal, the electric wires in the interior of the battery case 20 can be suitably protected, and leakage of electromagnetic noise radiated from the bus bar modules 80, 98, 99 to outside of the battery case 20 can be suppressed. Since the electric cables 27 which are a portion of the electric wire connecting the inverter 47 to the electric motor 42 are short in length, a cover for covering the electric cables 27 can be reduced in size.

Since the electric cables 27 are positioned apart from the seat 30 with the batteries 40 located between the electric cables 27 and the seat 30, it becomes possible to prevent a situation in which the electric cables 27 are present near the driver and interfere with the lower body of the driver such as their legs or their feet. This allows the driver more flexibility as to their driving posture. The rear portion of the battery case 20 is smaller in dimension in the rightward and leftward direction than the front portion of the battery case 20 is, and the electric wires (first bus bar module 80 and the electric cables 27) connecting the inverter 47 to the electric motor 42 are placed in the front portion of the group of the batteries 40. Therefore, the electric wires can be laid out more flexibly while allowing the driver to easily grip the battery case 20 with their knees.

Although in the present embodiment, the electric motorcycle has been exemplarily described as the electric vehicle, the electric vehicle may be a vehicle including three or more wheels, for example an ATV (all-terrain vehicle) so long as the vehicle is a straddle-type vehicle. Although the bus bars have been exemplarily described as the electric wires running through the interior of the battery case 20, other electric wires (e.g., electric cables) may be used. Or, a part or the entirety of the electric component group 46 including the inverter 47 may be placed inside of the battery case 20. Or, the cooling medium pipes 64, 65 may run through a region outside of the battery case 20, instead of the interior of the battery case 20. The present invention is not limited to the above-described embodiment, and its configuration can be changed, added to, or deleted from within the scope of the invention.

INDUSTRIAL APPLICABILITY

As described above, an electric vehicle of the present invention has the above-described advantages, and is effectively applicable to an electric vehicle such as an electric motorcycle, which can obtain these advantages.

REFERENCE CHARACTER LIST 1 electric motorcycle (electric vehicle)
20 battery case
27 electric cable
40 battery
42 electric motor
44 casing (motor case)
46 electric component group
47 inverter
80, 98, 99 bus bar module
81, 82 to 89, 94 to 96 bus bar
C1, C2 cooling passage
S2 battery space

The invention claimed is:

1. An electric vehicle comprising:
an electric motor which generates driving power for driving a wheel;
a battery case accommodating a plurality of batteries storing DC power to be supplied to the electric motor, in an internal space of the battery case;
an inverter which converts the DC power supplied from the batteries into AC power and supplies the AC power to the electric motor; and
an electric wire connecting the inverter to the electric motor,
wherein the electric wire includes a running portion running vertically through a space formed between the plurality of batteries in the internal space of the battery case.

2. The electric vehicle according to claim 1,
wherein the battery case is placed between the electric motor and the inverter.

3. The electric vehicle according to claim 1, further comprising:
a motor case accommodating the electric motor,
wherein the inverter is placed above the battery case, and the electric motor is placed below the battery case, and
wherein an electric cable is provided between a lower portion of the battery case and the motor case to couple the lower portion of the battery case to the motor case, the electric cable electrically connecting the running portion to the electric motor and having a higher flexibility than the running portion.

4. The electric vehicle according to claim 1,
wherein the electric wire includes three bus bars for a three-phase AC current which vertically runs through the internal space of the battery case, and
wherein surfaces of the three bus bars are joined to each other via an insulating material to form a bus bar module.

5. The electric vehicle according to claim 1,
wherein the electric wire includes a portion which runs through an interior of the battery case, penetrates an upper surface of the battery case, and protrudes upward, and the portion is connected to the inverter placed on an upper portion of the battery case.

6. The electric vehicle according to claim 1,
wherein in the internal space of the battery case, a cooling passage is constituted by the space formed between the plurality of batteries or a space formed between the batteries and the battery case, and
wherein the electric wire runs through the cooling passage in the internal space of the battery case.

7. The electric vehicle according to claim 1,
wherein a space in which the inverter is placed and the internal space are partitioned by a wall of the battery case, and
wherein the electric wire runs through the internal space interposed between the electric motor and the inverter.

8. The electric vehicle according to claim 1,
wherein the inverter is placed above the batteries, wherein the electric motor is placed below the batteries, and wherein the electric wire vertically runs through the internal space of the battery case.

9. The electric vehicle according to claim 1, wherein in the internal space of the battery case, a cooling passage is constituted by the space formed between the plurality of batteries or a space formed between the batteries and the battery case, and wherein the electric wire runs through the cooling passage along the cooling passage.

10. The electric vehicle according to claim 1, wherein the electric wire includes a bus bar.

11. The electric vehicle according to claim 1, wherein the inverter is fastened to the battery case and is placed above the batteries.

12. An electric vehicle comprising:

an electric motor which generates a driving power for driving a wheel;

a battery case accommodating a plurality of batteries storing a DC power to be supplied to the electric motor, in an internal space of the battery case;

an inverter which converts the DC power supplied from the batteries into an AC power and supplies the AC power to the electric motor; and an electric wire connecting the inverter to the electric motor, wherein the electric wire runs through a cooling passage formed in the battery case.

13. The electric vehicle according to claim 12, wherein the cooling passage is formed between the batteries disposed in the battery case.

14. An electric vehicle comprising:

an electric motor which generates a driving power for driving a wheel;

a battery case accommodating a plurality of batteries storing a DC power to be supplied to the electric motor, in an internal space of the battery case;

an inverter which converts the DC power supplied from the batteries into an AC power and supplies the AC power to the electric motor; and an electric wire which connects the inverter to the electric motor, the electric wire running through a cooling passage formed between the plurality of batteries in the internal space of the battery case; and a cooling fan which blows air to the cooling passage.

15. An electric vehicle comprising:

an electric motor which generates a driving power for driving a wheel;

a battery case accommodating a plurality of batteries storing a DC power to be supplied to the electric motor, in an internal space of the battery case;

an inverter which converts the DC power supplied from the batteries into an AC power and supplies the AC power to the electric motor; and an electric wire which connects the inverter to the electric motor, the electric wire running through a cooling passage formed between the plurality of batteries in the internal space of the battery case, wherein the inverter is fastened to the battery case and placed above the batteries.

16. The electric vehicle according to claim 15, wherein the inverter is placed above the battery case to be included within the battery case when viewed from above.

17. The electric vehicle according to claim 16, wherein the inverter is placed inward relative to front and ear edges and right and left edges of an assembly of the battery case and the batteries when viewed from above.

* * * * *